United States Patent
Putty et al.

[11] Patent Number: 5,383,362
[45] Date of Patent: Jan. 24, 1995

[54] CONTROL FOR VIBRATORY GYROSCOPE

[75] Inventors: Michael W. Putty, East Detroit; David S. Eddy, Washington, both of Mich.

[73] Assignee: General Motors Corporation, Detroit, Mich.

[21] Appl. No.: 11,554

[22] Filed: Feb. 1, 1993

[51] Int. Cl.$^6$ .............. G01P 15/08; G01P 15/125; G01P 15/14
[52] U.S. Cl. ............................. 73/505; 73/504
[58] Field of Search ......................... 73/505, 504

[56] References Cited

U.S. PATENT DOCUMENTS

| | | | |
|---|---|---|---|
| 3,719,074 | 3/1973 | Lynch | 73/505 |
| 4,384,409 | 5/1983 | Lao | 73/505 X |
| 4,655,081 | 4/1987 | Burdess | 73/505 |
| 4,699,005 | 10/1987 | Okabe | 73/505 |
| 4,951,508 | 8/1990 | Loper, Jr. et al. | 73/505 |
| 5,097,707 | 3/1992 | Church | 73/505 |
| 5,218,867 | 6/1993 | Varnham et al. | 73/505 |

*Primary Examiner*—Herbert Goldstein
*Assistant Examiner*—Joseph L. Felber
*Attorney, Agent, or Firm*—Vincent A. Cichosz

[57] ABSTRACT

A control circuit for a resonating rotation sensor has a pair of closed loop controls for independently controlling component traveling waves of a resonant pattern in a ring shaped resonant member. Frequency and phase quantities of the independent traveling waves as well as time dependant quantities thereof indicate total rotation angle, rotation raze and rotation direction.

10 Claims, 8 Drawing Sheets

5,383,362

CONTROL FOR VIBRATORY GYROSCOPE

BACKGROUND OF THE INVENTION

This invention is founded in the field of rotation sensors as typified by devices applying vibrating mechanical elements (vibratory elements) as the rotation indication means. Numerous base forms of vibratory elements used in such vibratory rotation sensors are known including disks, tuning forks, cylinders and hemispherical shells. All such vibratory rotation sensors exploit the effects of the Coriolis force produced by the rotation of its vibratory element(s). The Coriolis force is well known to detectably influence the orientation of a resonant vibratory pattern (standing wave) in a vibratory element in proportional accordance with the rotation of the element but independent of the rate of rotation.

Perhaps the most widely known form of vibratory rotation sensors employs three hemispherical shells as vibratory elements to detect rotation about three mutually orthogonal axes. Known in commercial avionics as Hemispherical Resonator Gyros (HRG), these devices provide a very high degree of accuracy and sensitivity at low rotation rates as required by inertial grade navigation systems. Other features of HRG include longer useful operating life, higher reliability and a more cost effective system than many alternative rotation sensing technologies for commercial and military aviation.

Other vibratory rotation sensors are intended mainly for tactical weapons guidance and control. Performance of this grade of sensor must withstand large linear and rotational accelerations characteristic of munitions. These types of sensors are more compact and less costly than HRG but are less accurate and sensitive at low rotation rates.

What are financially and functionally attractive rotation sensing packages in navigational avionics or weapons guidance are not so in other areas, for example commercial automotive electronics. Cost alone, aside from other factors such as size, mass and functional excesses or deficiencies would prohibit incorporation of such a device in an automobile for rotation sensing. A desirable automotive package would have a moderate degree of accuracy, rotation detection about a single axis, minimal size and mass, efficient design for mass manufacturing and cost commensurate with an automobile's overall price structure. Non-exhaustive exemplary system usages include vehicle navigation systems and chassis control systems such as active suspensions and active rear steering.

SUMMARY OF THE INVENTION

In general, the present invention is a simplified circuit and method for control and readout of a vibratory gyroscope. A control is provided for a vibratory gyroscope which exploits the effects of the Coriolis force upon a resonant standing wave pattern in a vibrating ring produced by rotation of the ring about its axis.

A resonant standing wave pattern in a ring comprises a pair of substantially sinusoidal countercirculating resonant traveling waves having radial vibration components and a wavelength equal to a whole number fraction of the ring circumference. A fundamental or lowest order resonant traveling wave has a wavelength equal to one-half the ring circumference. Countercirculating resonant traveling waves of equal wavelength in a perfectly symmetrical ring at rest travel at equal speeds thus resulting in a standing wave pattern which remains fixed relative to a reference position on the ring. Countercirculating resonant traveling waves in the same ring when it rotates are differentially perturbed in such a manner that each wave travels at a different speed from the other resulting in a standing wave pattern which lags or precesses the total angle through which the ring is rotated. As the rotation rate is increased, the difference in speed is concomitantly increased and vice-versa. The amount of lag in the standing wave pattern indicates the total angle of ring rotation and the speed differential between the countercirculating resonant traveling waves indicates the rate of ring rotation.

In one aspect of the present invention, a ring is caused to resonate at a natural resonant frequency and a standing wave pattern results having nodes and anti-nodes. The vibratory member exhibits low loss vibration due to high-Q characteristics of material, design shape and environment. The standing wave pattern is comprised of two distinct countercirculating resonant traveling waves whose sinusoidal patterns reinforce each other at the anti-nodes and cancel each other at the nodes. The frequency of each countercirculating resonant traveling wave is detected independent of the other. The frequency difference between the two countercirculating resonant traveling waves is a measure of rotation rate and direction of rotation of the ring.

In another aspect of the present invention, countercirculating resonant traveling waves are independently maintained in the vibrating ring. A clockwise loop maintains the clockwise wave by generating a reference wave which tracks the frequency and phase of the traveling wave in phase locked loop and drives the ring with appropriate phase relatives thereof at appropriate locations. A counterclockwise loop maintains the counterclockwise wave in an identical manner. The frequency difference between the two oscillator reference waves is a measure of the rotation rate and direction of the ring, and the phase difference therebetween is a measure of the standing wave pattern location relative to a predetermined reference on the ring.

In a particular form of the present invention, the clockwise loop has a pair of capacitive pick-offs located adjacent the ring aligned with two radii thereof separated by a predetermined angle. A resonant traveling wave produces a sinusoidal signal at each pickoff according to the speed thereof and at a fixed phase relationship according to the angle separating the pickoffs. Both signals are fed into the phase locked loop and compared in phase to the reference wave produced therein to thereby keep the phase of the reference wave locked to that of the clockwise resonant traveling wave. A pair of capacitive forcers are located adjacent the ring aligned with two radii thereof separated by a predetermined angle. Appropriate phase relatives of the reference wave are provided to the forcers according to the angle therebetween and absolute location so as to maintain the clockwise resonant traveling wave. A counterclockwise loop is provided which operates identically to maintain the counterclockwise resonant traveling wave.

Further aspects and advantages of the invention will be apparent from the detailed description, claims and accompanying drawings.

BRIEF DESCRIPTION OF THE DRAWINGS

FIG. 1a' illustrates precession of a resonant standing wave pattern in response to ring rotation.

DETAILED DESCRIPTION OF THE PREFERRED EMBODIMENT

Figure 1A:
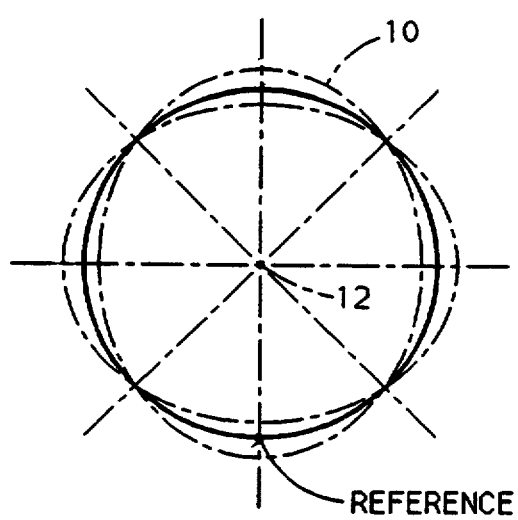
FIG. 1a illustrates a vibratory ring and resonant standing wave pattern.
Figure 1A:
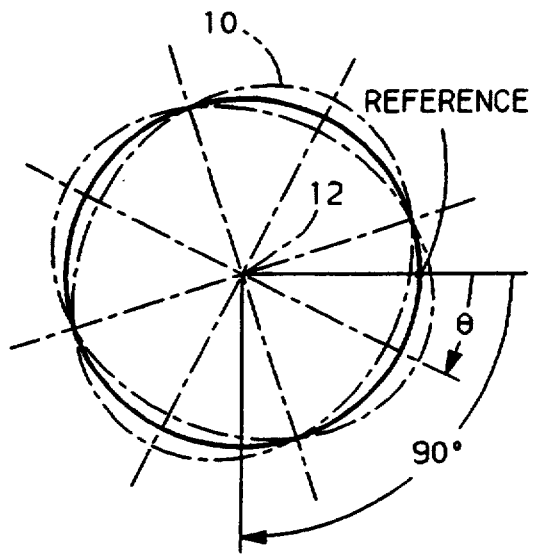

Referring to FIG. 1a as a general functional model, a vibratory gyro comprises a vibratory member having a ring-like portion 10 (hereafter ring) capable of sustaining substantially lossless radial vibrations about its central axis 12 of symmetry which direction is into the page. Central axis 12 is also the axis about which rotation is sensed. Support structures for ring 10 exhibit low radial damping loss such as the hemispherical portion of a wine glass shaped structure connected to a stem aligned with a central axis of symmetry. Other support structures, provided they similarly exhibit low radial damping loss, may also be employed, the precise support not being relevant to the present invention beyond this functionality proviso. Ring 10 has a normally static position shown by the heavy circular line and standing wave resonant vibrating positions shown by the broken elliptical lines representing radial deformations. The radial deformations reach relative maximums along a pair of orthogonal axes at the antinodes of the standing wave pattern. Radial deformations are substantially absent or minimal at the nodes of the pattern which align with a pair of orthogonal axes separated 45° from the antinodes. Absent rotation of the ring about its sensing axis, the standing wave pattern remains fixed relative ring 10. As ring is rotated through an angle such as 90° as shown in FIG. 1a', the standing wave pattern in ring 10 lags behind the rotation angle by an angle $\Theta$. The amount of lag is proportionally constant with respect no the total rotation angle. The lag angle is typically the measured quantity used to yield the total rotation angle.

Figure 1B:
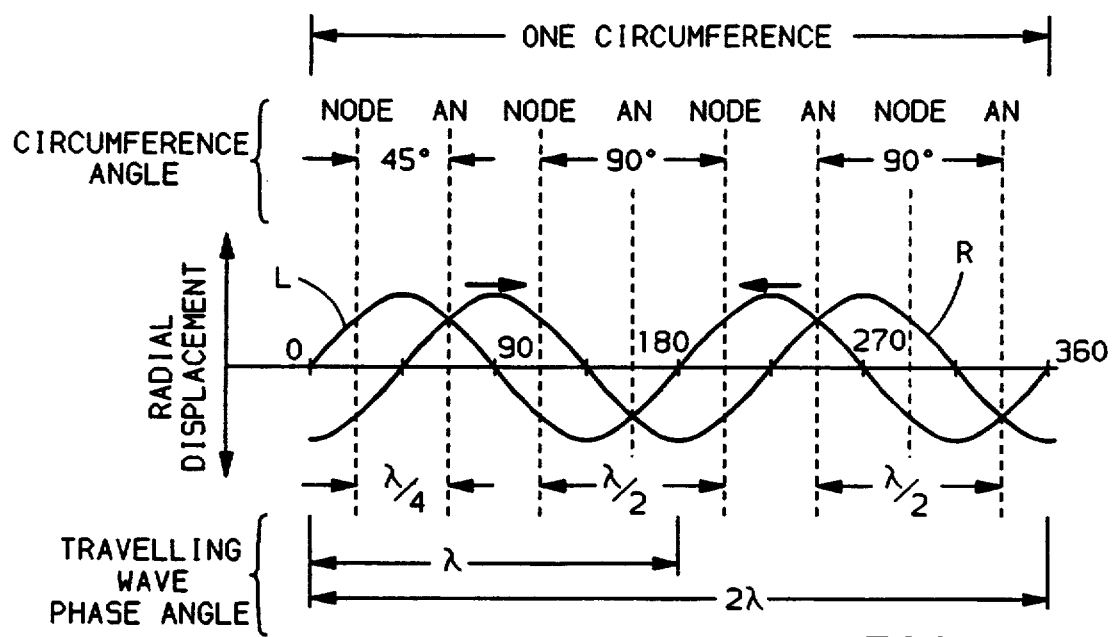
FIG. 1b illustrates countercirculating resonant traveling wave components of a resonant standing wave pattern.

The resonant standing wave pattern in ring 10 comprises a pair of equal wavelength countercirculating resonant traveling waves. FIG. 1b is demonstrative of the mechanics of two countercirculating resonant traveling waves in ring 10. Ring circumference is plotted horizontally from 0° to 360° as marked, where the 0° and 360° positions are one in the same as if ring 10 were split at that position and laid flat. Measurements in degrees (°) reference ring circumference and appear above the plotted waveforms. Measurements in fractions of wavelength ($\lambda$) reference traveling waves and appear below the plotted waveforms. Countercirculating waves labeled L and R are shown at arbitrary positions on ring and represent magnitude and direction of radial displacements along ring positions. Arrows above each wave indicate direction of travel in ring 10. Assuming a non-rotating ring, both traveling waves travel at the same speed and establish a standing wave pattern, the nodes and antinodes of which are positionally indicated by vertical dashed lines labeled node and AN respectively.

Examination of FIG. 1b results in an understanding that as equal speed countercirculating resonant traveling waves interact with each other, the radial components of each combine in such a way that the resultant radial displacement is always null at four static positions around the ring. These positions are the standing wave nodes and correspond to the ring positions where each traveling wave radial component is always equal but of opposite radial phase to the other. Further examinations shows that as equal speed countercirculating resonant traveling waves interact with each other, the radial components of each combine in such a way that the resultant radial displacement is always a local maximum (varying sinusoidally in magnitude) at four static positions around the ring. These positions are the standing wave antinodes and correspond to the ring positions where each traveling wave radial component is always equal and of the same radial phase to the other.

Continuing with reference to FIGS. 1a, 1a' and 1b, if ring 10 is rotated through an angle about axis 12, it is seen that the resonant standing wave pattern lags behind in position relative to ring 10. Each countercirculating resonant traveling wave in ring 10 during rotation thereof is perturbed relative its respective traveling speed. Each wavelength, however, remains equivalent to one-half the ring circumference. Since a differential in traveling speed is experienced, the points on the ring where nodes and antinodes appear will be seen to shift so long as a speed differential between the resonant traveling waves is present. Since the wavelengths remain unchanged, the distance between the nodes and antinodes remain constant even though their positions relative the ring shift. A ring rotating clockwise will increase the speed of the counterclockwise resonant traveling wave while decreasing the speed of the clockwise resonant traveling wave and vice-versa. For exposition, if waveform L is traveling at a higher speed than waveform R then the points along the ring where the waveforms cancel or reinforce will move to the left at a rate equal to the difference in speed between the two waveforms.

Figure 2:
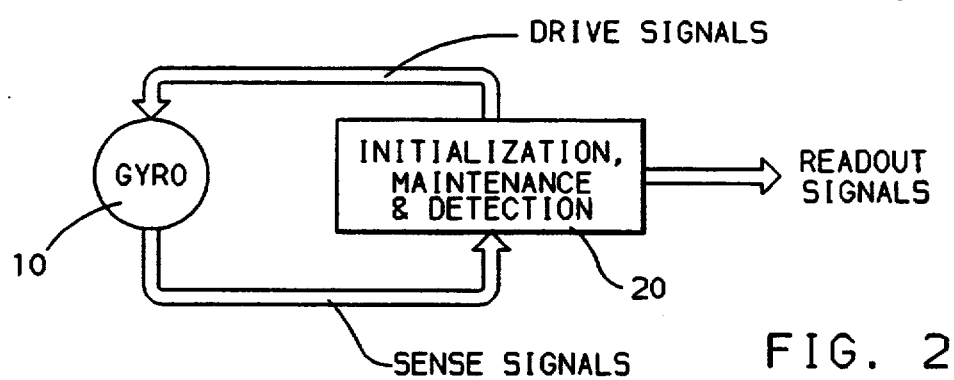
FIG. 2 is a simplified block diagram of the primary signal processing and control functions associated with vibratory gyroscopes.

FIG. 2 is fundamentally illustrative of vibratory gyroscope rotation sensing functions wherein ring 10 is radially displaced by drive signals from control 20 which functions to start the vibrations in the ring to establish a standing wave pattern and maintain the same. Radial deformations produce sense signals which are input to control 20 from where readout signal are obtained. Driving and sensing of the ring are preferably accomplished via electrostatic means such as capacitive forcer electrodes and pick-offs functionally equivalent to forms heretofore demonstrated in the art. Closed loop control is shown wherein the sense signals provide information for maintenance of the standing wave amplitude required due to damping losses and further provide information from which total rotation angle, rotation rate, rotation acceleration and all direction information of these quantities may be derived.

Figure 3:
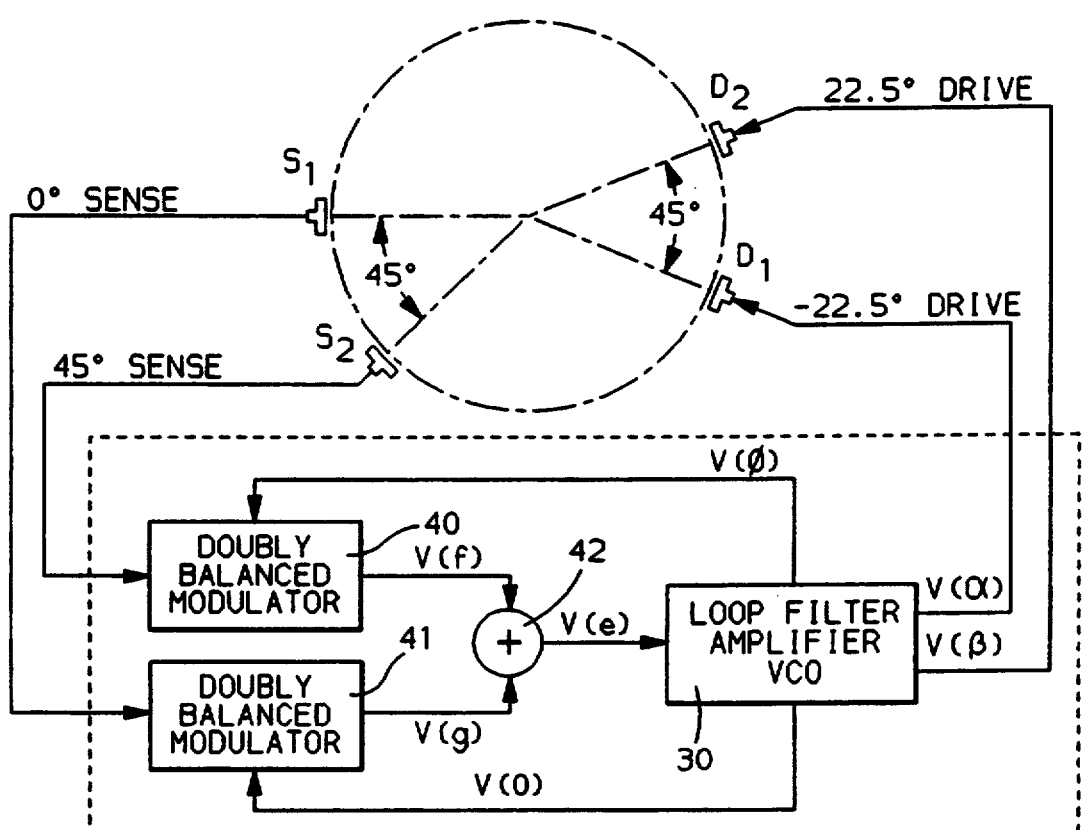
FIG. 3 shows a single traveling wave control loop according to the invention.

In a preferred form of the present invention, ring 10 has disposed about its perimeter a pair of sense electrodes designated $S_1$ and $S_2$. The angular separation between the sense electrodes is predetermined and preferably (for reasons more fully apparent as this description proceeds) designated to be 45° relative to the total 360° circumference of ring as shown in FIG. 3. For a fundamental resonant standing wave pattern, the 45° absolute angular separation between sense electrodes $S_1, S_2$ with respect to the ring circumference corresponds to one-half the absolute phase separation ($\lambda/4$) between the electrodes with respect to either countercirculating traveling wave of the standing wave pattern. Reference back to FIG. 1b clearly shows this correspondence graphically.

Each sense electrode is simultaneously exposed to the radial summation of both traveling waves (the standing wave) at their respective positions around the ring. In order to detect only a single one of the countercirculating resonant traveling waves comprising the standing wave with the pair of sense electrodes, unidirectional detection is employed. Sense electrode $S_1$ is arbitrarily chosen as the reference position on the ring and generates the 0° sense signal and sense electrode $S_2$ generates the 45° sense signal. A counterclockwise traveling wave will have radial displacements which propagate in the direction from sense electrode $S_1$ to sense electrode $S_2$ while a clockwise traveling wave will have radial displacements which propagate in the direction from sense electrode $S_2$ to sense electrode $S_1$. It should be recognized that in the case of the counterclockwise traveling wave the 0° sense signal leads the 45° sense signal by $\lambda/4$, whereas in the case of the clockwise traveling wave the 0° sense signal lags the 45° sense signal by $\lambda/4$.

A phase locked loop provides the basis for unidirectional detection and comprises a pair of independent doubly balanced modulators 40 and 41 summation node 42 and Voltage Controlled Oscillator (VCO) 30. VCO 30 provides a reference signal and a phase relative thereof as determined by the separation between sense electrodes $S_1$ and $S_2$ and direction of the traveling wave to be discerned. Reference signal V(0) is the modulating input to modulator 41 and the 0° sense signal is the modulated input thereto. VCO phase relative signal V($\phi$) is the modulating input to modulator 40 and the 45° sense signal is the modulated input thereto. VCO phase relative signal V($\phi$) required by the phase locked loop has the same degree and direction of phase lead lag of from reference signal V(0) as sense electrode $S_2$ has from sense electrode $S_1$ relative to the detected resonant traveling wave—in this exemplary embodiment $\lambda/4$. If the clockwise traveling wave was to be detected, VCO phase relative signal V($\phi$) of $-\lambda/4$ would be chosen as the modulating input to modulator 40. The modulated output signal V(f) from modulator 40 is summed with the at node 42 to generate therefrom an error signal V(e) for input to VCO 30. VCO 30 further comprises conventional amplification and filtering circuitry at its front end to condition error signal V(e) which is the controlling input that keeps the phase of reference signal V(0) locked to the phase of the traveling wave. In a preferred form of the present invention, the phase of the traveling wave is locked lagging the reference signal by 90°.

Continuing with discussion relative to a counterclockwise traveling wave, ring 10 has disposed about its perimeter a pair of drive electrodes designated $D_1, D_2$, the purpose of which is to restore energy to the counterclockwise traveling wave lost due to damping. The absolute angular separation between the drive electrodes is predetermined and preferably (for reasons more fully apparent as this description proceeds) designated to be 45° relative to the total 360° circumference of ring as shown in FIG. 3. For a fundamental resonant standing wave pattern, the 45° absolute angular separation between drive electrodes $D_1, D_2$ with respect to the ring circumference corresponds to one-half the absolute phase separation ($\lambda/4$) between the electrodes with respect to either countercirculating traveling wave of the standing wave pattern. Reference back to FIG. 1b clearly shows this correspondence graphically.

In order to excite only a single one of the countercirculating resonant traveling waves comprising the standing wave with the pair of sense electrodes, unidirectional driving is employed. It should be recognized that in the case of exciting a counterclockwise traveling wave the drive signal at drive electrode $D_1$ must lead the drive signal at drive electrode $D_2$ by $\lambda/4$, whereas in the case of exciting a clockwise traveling wave the drive signal at drive electrode $D_1$ must lag the drive signal at drive electrode $D_2$ by $\lambda/4$. A counterclockwise resonant traveling wave is therefore excited by applying an appropriate frequency periodic drive signal to drive electrode D1 and an appropriately lagging phase relative thereof to drive electrode D2. In this exemplary embodiment, the drive signal leads the phase relative by $\lambda/4$ which corresponds to the 45° circumferential separation between the electrodes and propagation direction of the desired traveling wave. It is further desirable that the drive voltage and phase relative thereof be applied so that their forces lead the ring's radial displacements at their respective electrode position by 90°. This is in agreement with maximum coupling of energy to the ring since in any maximally coupled resonant system it is well known that force leads displacement by 90°.

FIG. 3 shows a closed loop control employing unidirectional detection and drive as heretofore described. VCO 30 generates the signals necessary for phase locked detection of one traveling wave and for restoring energy lost therefrom due to damping. If a first drive electrode was placed directly opposite sense electrode $S_1$ (180° around the ring), and likewise a second drive electrode opposite sense electrode $S_2$, reference signal V(0) would be applied to the first and VCO phase relative signal V($\phi$) to the second. This is so because the resonant traveling wave pattern repeats itself twice in the ring circumference since its wavelength is one-half the circumference and the same phase component of the traveling wave will appear at diametrically opposed points around the ring. Recalling that reference signal V(0) leads the sensed signal am $S_1$, by 90° and the desirability of a 90° phase lead in the drive signal relative the ring displacement, reference signal V(0) is ideally suited for application to a first drive electrode placed at a point on the ring corresponding to the same phase component as sense electrode $S_1$. The same holds true for application of VCO phase relative V($\phi$) to a similarly placed second drive electrode relative to sense electrode $S_2$.

In a preferred embodiment as illustrated in FIG. 3, the drive electrodes are not diametrically opposed the sense electrodes. Rather, the drive electrodes are shifted from a diametrically opposed position by $-22.5°$ so that the point on the ring diametrically opposing the 0° reference position is straddled thereby. VCO phase relative signals V(α) and V(β) applied thereto, in order to maintain the preferred phase relationship between the signal applied and the radial displacements, are likewise shifted by an amount equivalent to the corresponding shift along the traveling wave. In this case, the shift of drive electrodes $D_1$ and $D_2$ by $-22.5°$ relative to the ring circumference corresponds to a shift of $-\lambda/8$ relative the traveling wave. Therefore, the VCO phase relatives applied drive electrodes $D_1$ and $D_2$ in this exemplary embodiment are respectively V(α) of $-\lambda/8$ and V(β) of $\lambda/8$. Drive electrodes alternatively may be positioned diametrically opposing their illustrated positions without change in their functionality again due to the repetition of the traveling wave pattern. A primary advantage of the preferred shift of drive electrodes by $-22.5°$ is that they will be located at alternating positions with the sense electrodes and therefore will not physically interfere therewith. Drive electrode $D_1$ applies the $-22.5°$ drive signal and drive electrode $D_2$ applies the $22.5°$ drive signal in correspondence with their effective positions relative the ring circumference which, in this exemplary embodiment, corresponds to the $-\lambda/8$ and $\lambda/8$ VCO phase relatives respectively.

The closed loop control illustrated in FIG. 3 can be duplicated at other sense and drive points around the ring to similarly detect and maintain a traveling wave in a countercirculating direction to the other. It is preferred, however, to share sense electrode and drive electrodes between a pair of countercirculating traveling wave control loops. With no change in the position of any electrodes as illustrated in FIG. 3, the control loop heretofore described as detecting and maintaining a counterclockwise traveling wave can be adapted to detect and maintain a clockwise traveling wave with appropriate VCO phase relative substitutions. For a clockwise traveling wave control loop, V(φ) would be the $-\lambda/4$ phase relative, V(α) would be the $\lambda/8$ phase relative and V(β) would be the $-\lambda/8$ phase relative. Additionally, sense and drive electrodes may be shared by separate countercirculating traveling wave control loops by buffering the sense signals and electronically adding the drive signals from each respective control loop VCO. Each control loop will operate independent of the other while sharing the same sense and drive electrodes.

Figure 4:
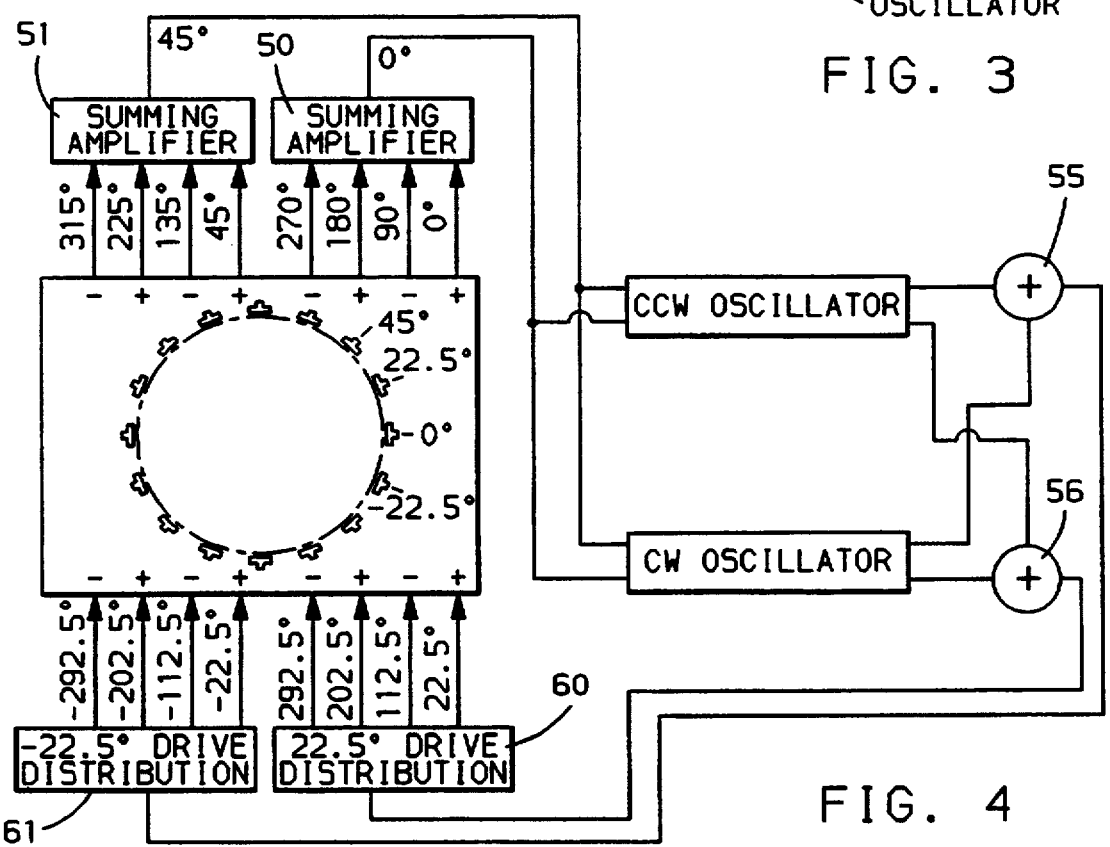
FIG. 4 shows a pair of traveling wave control loops according to a preferred sensor arrangement according to the invention.

It is also preferred to increase the number of sense electrodes and drive electrodes and distribute them regularly around the circumference of the ring. FIG. 4 is demonstrative of a sensor arrangement according to the present invention that distributes sense and drive electrodes around the ring and shares electrodes between independent countercirculating traveling wave control loops as previously described. A 0° reference is shown next to one sense electrode. Four 0° sense electrodes orthoganally dispersed around the ring perimeter are electronically coupled to summing amplifier 50 as shown to generate the 0° sense signal. The arithmetic sign at the input arrow corresponding to the position of the sense electrode indicates whether the individual sensed signal is inverted prior to summation with the others—signals 90° separated relative the ring circumference are 180° out of phase with each other and require inversion of one before addition to the other to ensure absolute addition of the signal magnitudes. The net output from summing amplifier 50 is the 0° sense signal analogous to that generated at the single sense electrode $S_1$ in FIG. 3. Similarly, the 45° sense signal is generated at summing amplifier 51 by appropriate inversion and summation of four orthogonally dispersed 45° sense electrodes separated by 45° from the 0° sense electrodes. The net output from summing amplifier 51 is the 45° sense signal analogous to that generated at the single sense electrode $S_2$ in FIG. 3. The main advantage of the orthogonal sense electrode arrangement is that it rejects any rigid body motions of the ring since the motion will result in no net signal making the sensor response immune to linear acceleration.

Each sense signal, 0° and 45°, is input with the other to an oscillator having a phase locked loop for detecting one of the countercirculating traveling waves therefrom as previously described. The oscillators are depicted in FIG. 4 as CCW oscillator and CW oscillator for counterclockwise and clockwise traveling wave control loops respectively. VCO phase relatives from the CCW oscillator and VCO phase relatives from the CW oscillator that are to be applied to shared drive electrodes are summed at nodes 55 and 56 resulting in a pair of net drive signals.

Similar to the configuration of the sense electrodes, four 22.5° drive electrodes orthogonally dispersed around the ring perimeter are electronically coupled to 22.5° drive 60 as shown. The input signal to 22.5° drive 60 is the sum of the CW and CCW oscillators'phase relatives which individually would be applied as respective 22.5° drive signals in the absence of the other. The summation of the CW and CCW 22.5° drive signals is shown at summation node 56. The 22.5° drive signal is distributed to the four 22.5° drive electrodes in proper phase with the ring's radial displacement as indicated by the arithmetic sign at the arrow corresponding to the position of the individual drive electrode. The phase adjustment is necessary since the ring's radial displacements at positions 90° separated relative the ring circumference are 180° out of phase relative the resonant pattern. Similarly, the CW and CCW $-22.5°$ drive signals are summed at summation node 55 and applied to $-22.5°$ drive 61. The $-22.5°$ drive signal is likewise distributed to the four $-22.5°$ drive electrodes in proper phase with the ring's radial displacement as heretofore described. The main advantage of the orthogonal drive electrode arrangement is that it balances energy input to the ring thereby not exciting any rigid body motions into the ring.

Figure 5A:
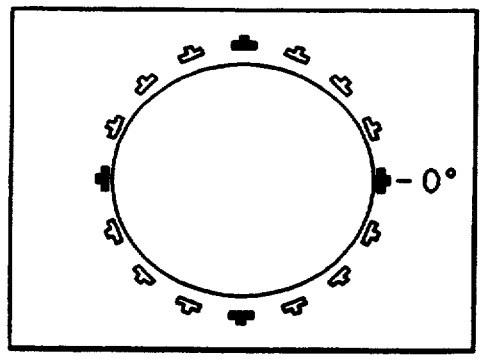
FIGS. 5a–c show a 0° aligned pattern location relative the sense and drive electrodes and various signals at sense and drive electrodes and at respective traveling wave control loop positions.
Figure 5B:
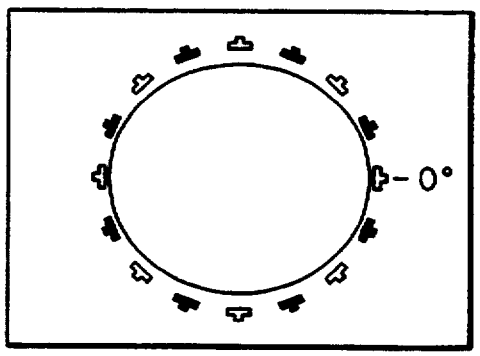
Figure 5C:
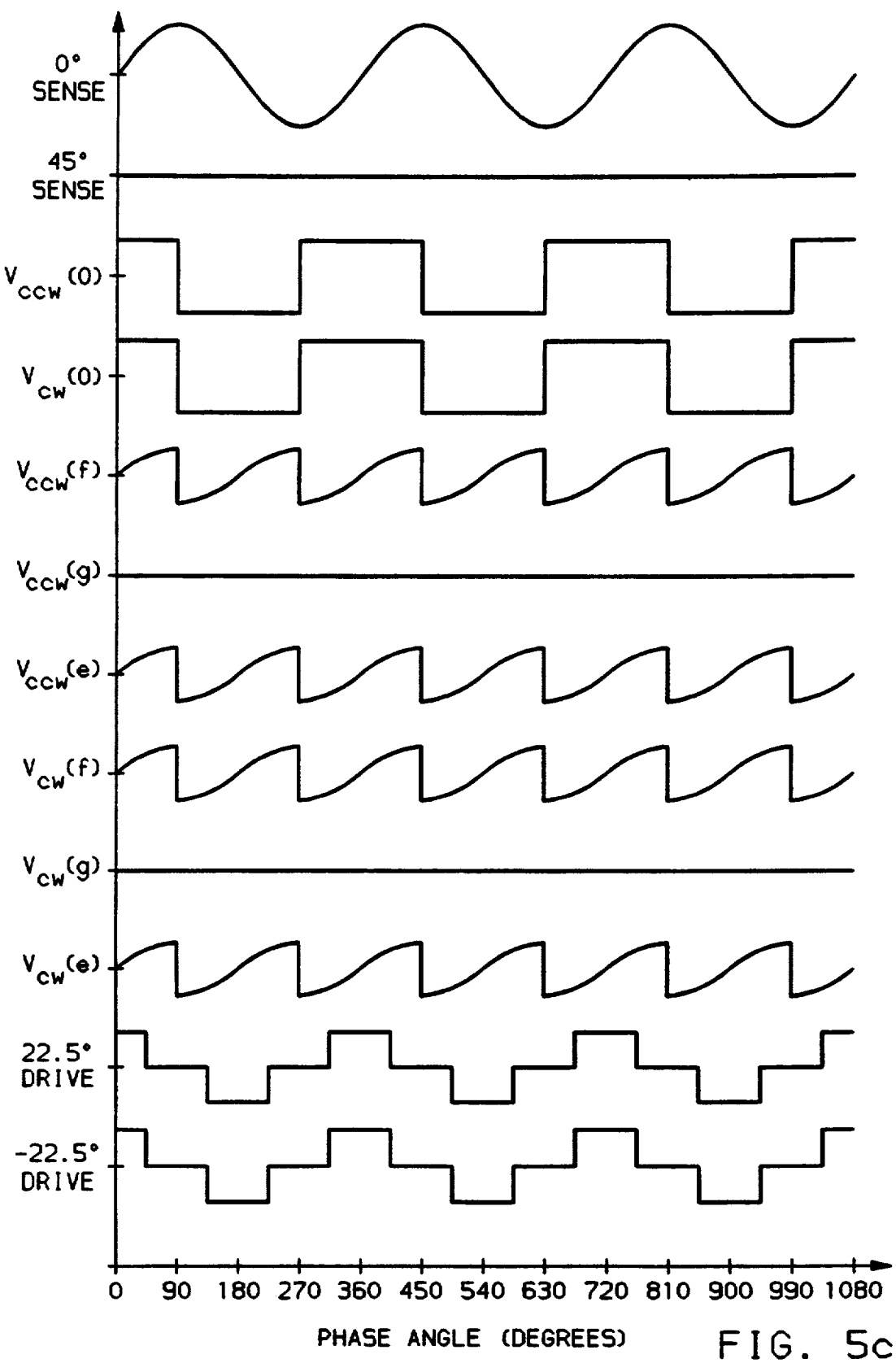

To understand the closed loop operation of a dual oscillator circuit as described, it is instructive to refer to FIGS. 5–7 to examine various circuit voltages at positions around the ring and control loops as identified in FIGS. 3 and 4 (note that subscript designations CW and CCW merely indicate the traveling wave control loop referenced). Three specific resonant standing wave vibration patterns are illustrated and addressed one at a time from which description the general case can be inferred. FIG. 5a shows a vibration pattern with an antinode aligned with the 0° reference—which is also the orthogonal axis set for the 0° sense signal. At this location, the ring displacement only produces a 0° sense signal since the vibration pattern antinodes are perfectly aligned with the four 0° sense electrodes shown darkened. No signal is produced at the 45° sense electrodes because the nodes of the vibration pattern are perfectly aligned therewith. Both oscillator reference signals $V_{cw}(0)$ and $V_{ccw}(0)$ must lead the 0° sense signal by 90° for the error signals to be zero. If either one of the reference signals does not have the proper phase with respect to the 0° sense signal an error voltage is generated which causes the feedback loop to adjust the appropriate VCO until the correct phase relationship is obtained. For the error signals to be zero, the phase shift between the reference signals of the oscillators must be zero, and also the phase shift between the drive signals and the ring displacement must be 90° as required to drive the ring at resonance. Only under these conditions will the error signals be zero. Visually shifting the phase of either oscillator will confirm this. As previously described, the drive signals are generated by combining the appropriate phase relatives of the two oscillator reference signals. The 22.5° drive signal is generated by summing $V_{ccw}(-\lambda/8)$ and $V_{cw}(-\lambda/8)$ at node 56 while the $-22.5°$ drive signal is generated by summing $V_{ccw}(-\lambda/8)$ and $V_{cw}(\lambda/8)$ at node 55. Examination of FIGS. 5b and 5c illustrates how the combination of drive signals correctly drives the resonant pattern having antinodes aligned with the four 0° sense electrodes and nodes aligned with the four 45° sense electrodes. The phase shift between the reference signals of the oscillators is 0° and the drive signals are split equally between the 22.5° and −22.5° drive electrodes as would be expected since the vibration pattern is symmetrical about these two axis sets.

Figure 6A:
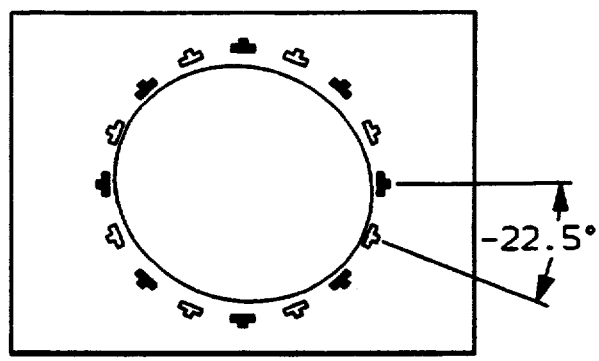
FIGS. 6a–c show a −22.5° aligned pattern location relative the sense and drive electrodes and various signals at sense and drive electrodes and at respective traveling wave control loop positions.
Figure 6B:
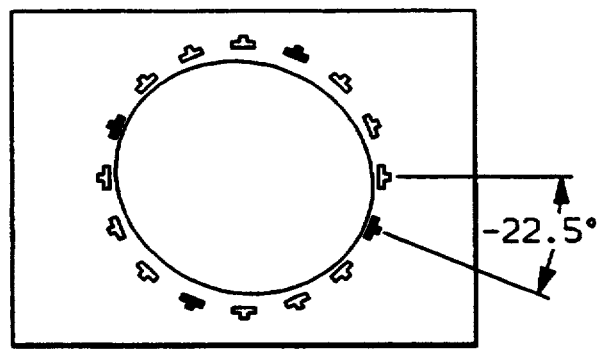
Figure 6C:
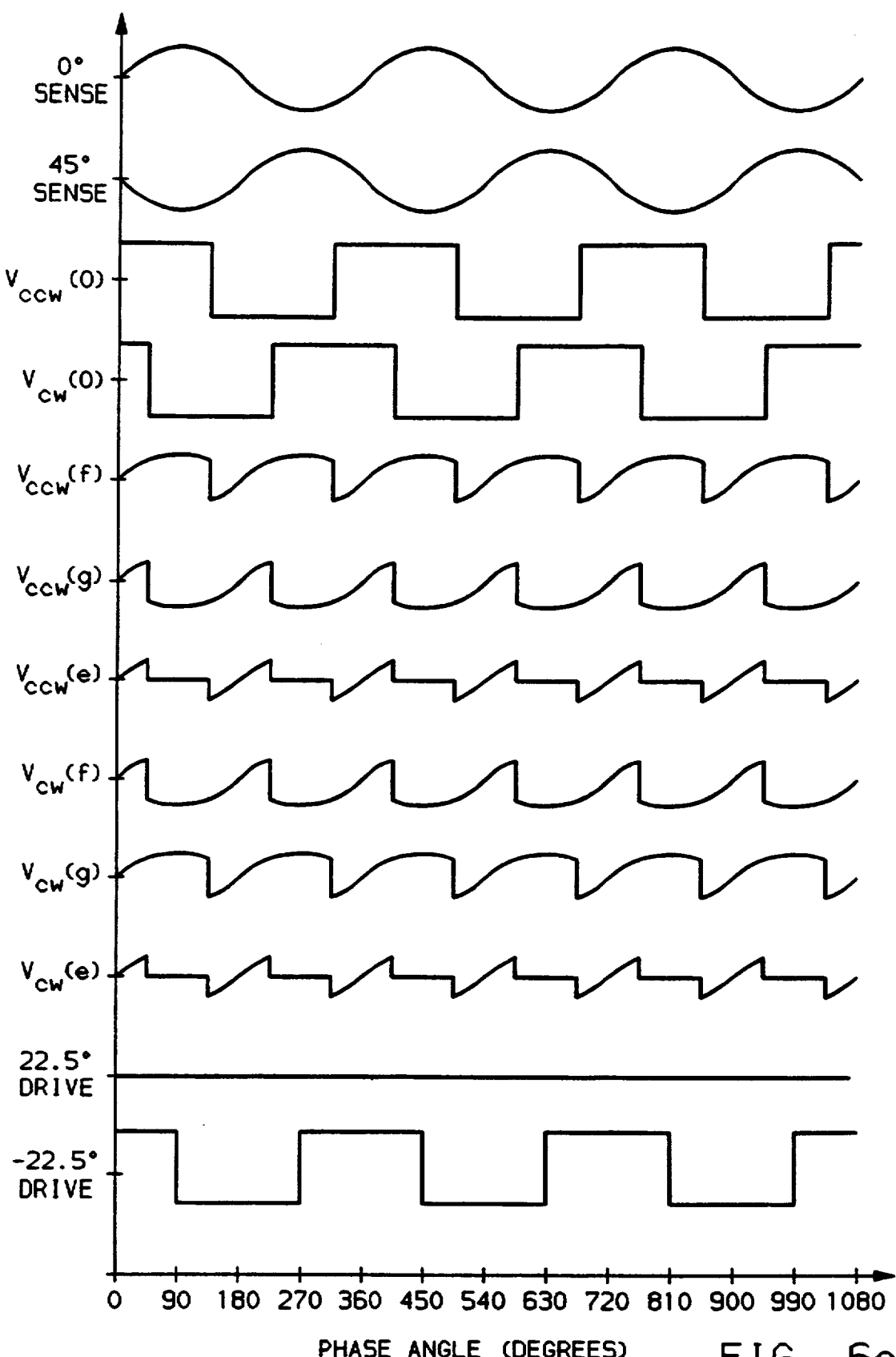

FIG. 6a shows a vibration pattern with an antinode aligned −22.5° from the 0° reference—which is also the orthogonal axis set for the −22.5° drive signal. At this location, the ring displacement produces a 0° sense signal and a 45° sense signal. The affected sense electrodes are shown darkened. The 0° sense signal is 180° out of phase with the 45° sense signal. The CCW oscillator reference signal $V_{ccw}(0)$ must lead the 0° sense signal by 45° and the CW oscillator reference signal $V_{cw}(0)$ must lag the 0° sense signal by 45° for the corresponding error signals $V_{ccw}(e)$ and $V_{cw}(e)$ to be zero. If either one of the reference signals does not have the proper phase with respect to the 0° sense signal an error signal is generated which causes the feedback loop to adjust the appropriate VCO until the correct phase relationship is obtained. For the error signals to be zero, the phase shift between the reference signals of the oscillators must be −90°, and also the phase shift between the drive signals and the ring displacement must be 90° as required to drive the ring at resonance. Only under these conditions will the error signals be zero. Visually shifting the phase of either oscillator will confirm this. The drive signals generated by combining the appropriate phase relatives of the two oscillator reference signals are illustrated in FIG. 6c which together with FIG. 6b shows how the combination of drive signals correctly drives the resonant pattern having antinodes aligned with the four −22.5° drive electrodes. The phase shift between the reference signals of the oscillators is −90° and the drive signal is applied entirely to the −22.5° drive electrodes as would be expected since the vibration pattern is directly aligned with that axis set.

Figure 7A:
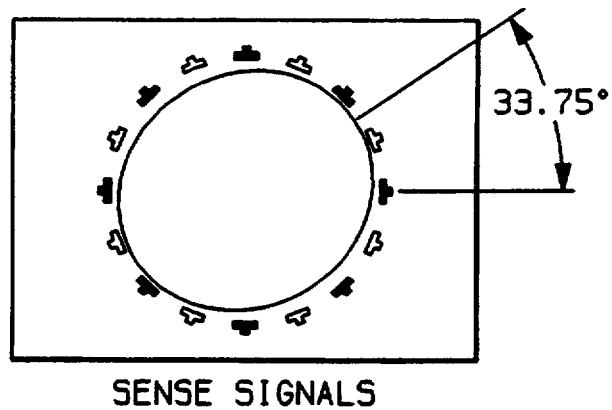
FIGS. 7a–c show a 33.75° aligned pattern location relative the sense and drive electrodes and various signals at sense and drive electrodes and at respective traveling wave control loop positions.
Figure 7B:
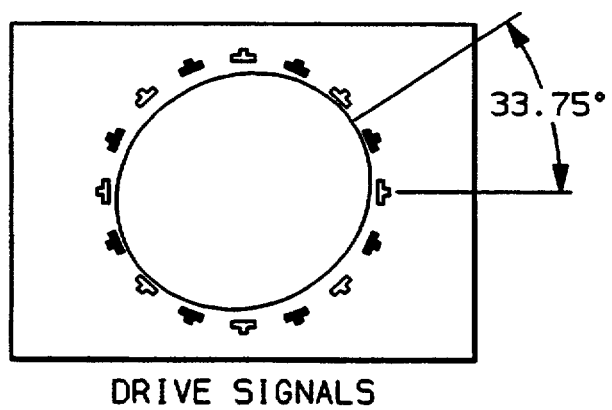
Figure 7C:
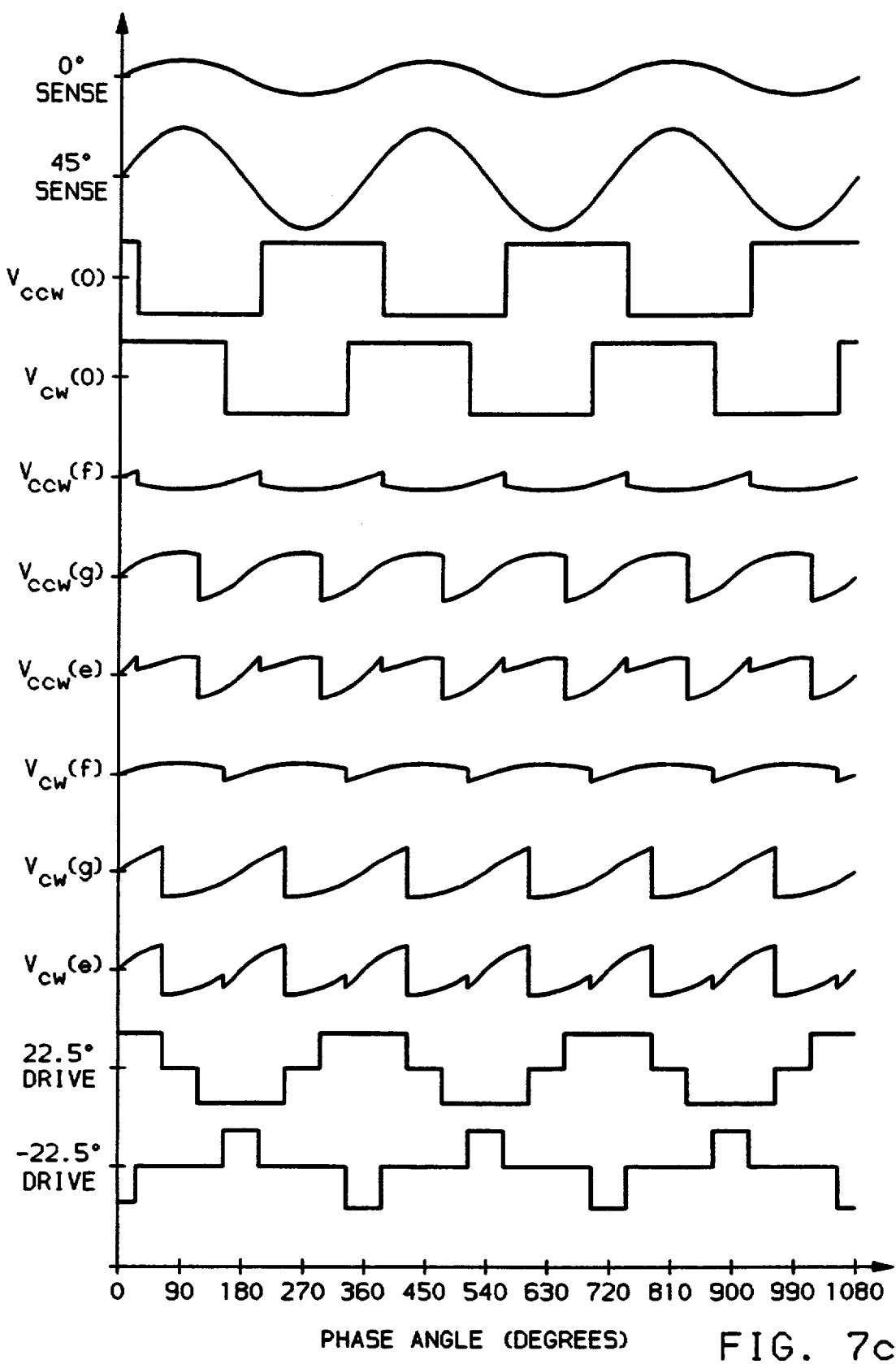

FIG. 7a shows a vibration pattern with an antinode aligned 33.75° from the 0° reference—which is an alignment not along any orthogonal axis set of sense or drive electrodes. At this location, the ring displacement produces a 0° sense signal and a 45° sense signal. The affected sense electrodes are shown darkened. The 0° sense signal is in phase with the 45° sense signal. The CCW oscillator reference signal $V_{ccw}(0)$ must lead the 0° sense signal by 157.5° and the CW oscillator reference signal $V_{cw}(0)$ must lead the 0° sense signal by 22.5° for the corresponding error signals $V_{ccw}(e)$ and $V_{cw}(e)$ to be zero. If either one of the reference signals does not have the proper phase with respect to the 0° sense signal an error signal is generated which causes the feedback loop to adjust the appropriate VCO until the correct phase relationship is obtained. For the error signals to be zero, the phase shift between the reference signals of the oscillators must be 135°, and also the phase shift between the drive signals and the ring displacement must be 90° as required to drive the ring at resonance. Only under these conditions will the error signals be zero. Visually shifting the phase of either oscillator will confirm this. The drive signals generated by combining the appropriate phase relatives of the two oscillator reference signals are illustrated in FIG. 7c which together with FIG. 7b shows how the combination of drive signals correctly drives the resonant pattern having antinodes aligned 33.75° from the 0° reference. The phase shift between the reference signals of the oscillators is 135° and the drive signals is are split between the 22.5° and −22.5° drive in proportion to the needed drive contribution at those axis sets as would be expected since the vibration pattern, while located between these two drive axis sets, is not located symmetrically therebetween.

The general case inferred from these examples of pattern locations is that the vibration pattern angle with respect to the 0° reference is one-quarter the phase difference between the oscillator's respective reference signals ($V_{ccw}(0)$ and $V_{cw}(0)$). The direction of rotation is available by determining which oscillator has a net phase lead and which has a net phase lag. Further, the instantaneous rate of angular rotation is obtainable from the difference between oscillator frequencies.

Pattern drift due to physical nonuniformities of the vibratory member may be minimized by the addition of preferably sixteen additional electrodes (not illustrated in the drawings for clarity). Four sees of four orthogonal balance electrodes disposed symmetrically between the existing drive and sense electrode sets can be open loop calibrated by applying a DC voltage thereto. Each set therefore acts as a negative electrical spring effective to counter the nonuniformities in the vibratory member. Open loop calibration of the balance electrodes is sufficient for most applications anticipated; however, where higher accuracy is desired the balance electrodes can be part of an additional control loop for continuous trimming of the vibratory member using well known quadrature error detection and control methodologies.

The preceding description of a preferred embodiment is offered by way of illustration and example and not by way of limitation or exclusion of other embodiments consistent with the spirit and scope of the invention as defined by the appended claims.

The embodiments of the invention in which an exclusive property or privilege is claimed are defined as follows:

1. A control for a vibratory gyroscope having a vibratory member defining a substantially circular portion capable of supporting high-Q radial vibration in a standing wave pattern about an axis comprising, in combination:

dual oscillator means for radially displacing said circular portion along at least two radii thereof separated by a first predetermined angle to establish and maintain a pair of countercirculating resonant traveling waves;

discriminating means for establishing from the direction and magnitude of radial displacements of said circular portion along at least two radii thereof separated by a second predetermined angle a respective phase difference for each countercirculating traveling wave relative to a respective dual oscillator reference wave; and means for controlling each respective phase difference to a third predetermined angle, whereby the frequency difference between the respective dual oscillator reference waves is a measure of the rotation rate and the phase difference therebetween is a measure of the total angle of rotation.

2. A control for a vibratory gyroscope having a vibratory member defining a substantially circular portion capable of supporting high-Q radial vibration in a standing wave pattern about an axis comprising, in combination:

dual oscillator means for radially displacing said circular portion along at least two radii thereof separated by a first predetermined angle to establish and maintain a pair of countercirculating resonant traveling waves;

discriminating means for establishing from the direction and magnitude of radial displacements of said circular portion along at least two radii thereof separated by a second predetermined angle a respective phase difference for each countercirculating traveling wave relative to a respective dual oscillator reference wave; and a pair of phase locked loops for closed loop controlling the phase difference between each countercirculating traveling wave and its respective dual oscillator reference wave, whereby the frequency difference between the respective dual oscillator reference waves is a measure of the rotation rate and the phase difference therebetween is a measure of the total angle of rotation.

3. A control as claimed in claim 2 wherein each of said countercirculating resonant traveling waves comprises a fundamental resonant traveling wave.

4. A control as claimed in claim 2 wherein said dual oscillator means comprises a plurality of capacitive forcers, each of the forcers being positioned adjacent said circular portion along one of said radii.

5. A control as claimed in claim 2 wherein said discriminating means comprises a plurality of capacitive pickoffs, each of the pickoffs being positioned adjacent said circular portion along one of said radii.

6. A control as claimed in claim 2 wherein the predetermined angles separating the radii correspond to one-quarter wavelength of the traveling wave.

7. A control for a vibratory gyroscope having a vibratory member defining a substantially circular waveguide capable of supporting high-Q radial vibration in a standing wave pattern about an axis comprising, in combination:

a unidirectional driver for generating a reference signal effective to excite a resonant traveling wave in said circular waveguide;

a unidirectional receiver responsive to the traveling wave and effective to produce a pair of resonant traveling wave phase components;

means responsive to said resonant traveling wave phase components and said reference signal phase components for producing a phase error signal; and a phase locked loop responsive to said phase error signal for regulating said reference signal by forcing said phase error signal to zero to thereby keep the phase of the reference signal locked to the phase of the resonant traveling wave.

8. A control for a vibratory gyroscope having a vibratory member defining a substantially circular portion capable of supporting high-Q radial vibration in a standing wave pattern about an axis comprising, in combination:

pick-off means responsive to radial motion at two positions adjacent said circular portion separated by a predetermined angle for producing first and second pick-off signals equal to the summation of equal wavelength clockwise and counterclockwise resonant traveling waves at each respective pick-off means;

means for generating first and second reference signals;

clockwise separating means responsive to said first and second pick-off signals and phase relatives of said first reference signal for producing a clockwise error signal proportional to the phase difference between the clockwise resonant traveling wave and said first reference signal;

counterclockwise separating means responsive to said first and second pick-off signals and phase relatives of said second reference signal for producing a counterclockwise error signal proportional to the phase difference between the counterclockwise resonant traveling wave and said second reference signal;

a phase locked loop responsive to said clockwise error signal for locking the phase of the first reference signal to the phase of the clockwise resonant traveling wave; and a phase locked loop responsive to said counterclockwise error signal for locking the phase of the second reference signal to the phase of the counterclockwise resonant traveling wave.

9. A control for a vibratory gyroscope having a vibratory member defining a substantially circular portion capable of supporting high-Q radial vibration in a standing wave pattern about an axis comprising, in combination:

an electro-mechanical clockwise traveling wave loop for
a) launching a clockwise resonant traveling wave in said circular portion, said wave having a wavelength of one-half the circumference of said circular portion and a unit amplitude,
b) maintaining the unit amplitude of the clockwise resonant traveling wave with a predetermined phase relative of a clockwise reference signal,
c) tracking the frequency of the clockwise resonant traveling wave,
d) tracking the phase of the clockwise resonant traveling wave relative to a predetermined phase relative of the reference signal;

an electro-mechanical counterclockwise traveling wave loop for
a) launching a counterclockwise resonant traveling wave in said circular portion, said wave having a wavelength of one-half the circumference of said circular portion and the unit amplitude,
b) maintaining the unit amplitude of the counterclockwise resonant traveling wave with a predetermined phase relative of a counterclockwise reference signal,
c) tracking the frequency of the counterclockwise resonant traveling wave,
d) tracking the phase of the counterclockwise resonant traveling wave relative to a predetermined phase relative of the counterclockwise reference signal, whereby the frequency difference between the respective reference signals is a measure of the rotation rate and the phase difference between the respective reference signals is a measure of the total angle of rotation.

10. A method for controlling a vibratory gyroscope having a vibratory member defining a substantially circular portion capable of supporting high-Q radial vibration in a standing wave pattern about an axis comprising the steps of:

a) launching a clockwise resonant traveling wave in said circular portion, said wave having a wavelength of one-half the circumference of said circular portion and a unit amplitude;

b) maintaining the unit amplitude of the clockwise resonant traveling wave with a predetermined phase relative of a clockwise reference signal;

c) tracking the frequency of the clockwise resonant traveling wave;

d) tracking the phase of the clockwise resonant traveling wave relative to a predetermined phase relative of the reference signal;

e) launching a counterclockwise resonant traveling wave in said circular portion, said wave having a wavelength of one-half the circumference of said circular portion and the unit amplitude;

f) maintaining the unit amplitude of the counterclockwise resonant traveling wave with a predetermined phase relative of a counterclockwise reference signal;

g) tracking the frequency of the counterclockwise resonant traveling wave; and h) tracking the phase of the counterclockwise resonant traveling wave relative to a predetermined phase relative of the counterclockwise reference signal.

* * * * *